United States Patent
Park et al.

(10) Patent No.: US 9,997,780 B2
(45) Date of Patent: Jun. 12, 2018

(54) POSITIVE ELECTRODE FOR LITHIUM SECONDARY BATTERY AND LITHIUM SECONDARY BATTERY COMPRISING THE SAME

(71) Applicant: LG CHEM, LTD., Seoul (KR)

(72) Inventors: Ji-Hye Park, Daejeon (KR); Jae-Hyun Lee, Daejeon (KR); Su-Rim Lee, Daejeon (KR); Song-Taek Oh, Daejeon (KR); Jung-Seok Choi, Daejeon (KR); Hyeok-Moo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 214 days.

(21) Appl. No.: 14/765,515

(22) PCT Filed: Oct. 31, 2014

(86) PCT No.: PCT/KR2014/010398
§ 371 (c)(1),
(2) Date: Aug. 3, 2015

(87) PCT Pub. No.: WO2015/065126
PCT Pub. Date: May 7, 2015

(65) Prior Publication Data
US 2015/0364760 A1    Dec. 17, 2015

(30) Foreign Application Priority Data
Oct. 31, 2013    (KR) .................. 10-2013-0131533

(51) Int. Cl.
| | |
|---|---|
| *H01M 4/505* | (2010.01) |
| *H01M 10/052* | (2010.01) |
| *H01M 4/131* | (2010.01) |
| *H01M 4/50* | (2010.01) |
| *H01M 4/02* | (2006.01) |

(52) U.S. Cl.
CPC ........... *H01M 4/505* (2013.01); *H01M 4/131* (2013.01); *H01M 10/052* (2013.01); *H01M 4/50* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2003/0134200 A1 | 7/2003 | Tanaka et al. | |
| 2011/0183209 A1 | 7/2011 | Chritensen et al. | |
| 2013/0288112 A1* | 10/2013 | Ito | H01G 11/62 429/188 |
| 2013/0288121 A1* | 10/2013 | Nagai | H01M 4/13 429/211 |
| 2015/0030925 A1* | 1/2015 | Konishi | H01M 4/505 429/223 |

FOREIGN PATENT DOCUMENTS

| | | |
|---|---|---|
| KR | 10-1999-0085021 A | 12/1999 |
| KR | 10-2002-0080448 A | 10/2002 |
| KR | 10-2012-0124452 A | 11/2012 |
| KR | 10-2013-0024595 A | 3/2013 |
| KR | 10-2013-0116810 A | 10/2013 |
| WO | WO 2012063370 | * 5/2012 |

OTHER PUBLICATIONS

International Search Report issued in PCT/KR2014/010398, dated Mar. 13, 2015.

* cited by examiner

*Primary Examiner* — Jeremiah R Smith
(74) *Attorney, Agent, or Firm* — Birch, Stewart, Kolasch & Birch, LLP

(57) ABSTRACT

The present disclosure relates to a positive electrode for a lithium secondary battery including an electrode current collector, and a positive electrode active material layer coated on at least a part of the electrode current collector, wherein the positive electrode active material layer includes a manganese-based positive electrode active material, and a porosity is from 30% to 35%, to improve high-temperature storage characteristics and high-temperature cycle characteristics.

5 Claims, 3 Drawing Sheets

POSITIVE ELECTRODE FOR LITHIUM SECONDARY BATTERY AND LITHIUM SECONDARY BATTERY COMPRISING THE SAME

TECHNICAL FIELD

The present disclosure relates to a positive electrode for a lithium secondary battery and a lithium secondary battery comprising the same, and more particularly, to a positive electrode for a lithium secondary battery with improved high-temperature cycle characteristics and high-temperature storage performance.

The present application claims priority to Korean Patent Application No. 10-2013-0131533 filed in the Republic of Korea on Oct. 31, 2013, the disclosures of which are incorporated herein by reference.

BACKGROUND ART

With the technology development and the growing demands for mobile devices, the demand for secondary batteries as an energy source is dramatically increasing, and among secondary batteries, lithium secondary batteries with high energy density and discharge voltage have been studied extensively and are being widely used in the commercial industries. Moreover, with the accelerated development of electric vehicle such as hybrid vehicle to solve the environmental problem caused by automobile exhaust gas, studies on the use of lithium secondary batteries as an automobile power source are also making a fast progress.

A lithium secondary battery includes a positive electrode, a negative electrode, and an electrolyte solution, and by the intercalation of lithium ions from a positive electrode active material to a negative electrode active material, for example, carbon particles, during first charge and deintercalation for discharge, also known as energy transfer between the two electrodes, the lithium secondary battery can be charged and discharged.

The positive electrode active material used in the lithium secondary battery includes lithium cobalt composite oxide, lithium nickel composite oxide, and lithium manganese composite oxide, and among them, lithium manganese composite oxide is gaining attention due to the use of manganese of rich resources and low costs as a main raw material.

However, manganese-based lithium secondary batteries using lithium manganese composite oxide as a positive electrode active material have a problem with the release of manganese into an electrolyte solution during charging and discharging processes, causing battery degradation. The release of manganese substance becomes more serious when stored at high temperature, and when the released manganese substance is precipitated on the surface of a negative electrode active material, for example, a carbon material, the electrolyte solution decomposes fast in the negative electrode active material by a reduction reaction with electrons from the negative electrode active material, accompanied by an increase in resistance of the battery. This problem causes a serious deterioration in output (power), and is an obstruction to development of high-performance (high-output) manganese-based lithium secondary batteries.

Accordingly, in the lithium secondary batteries using a manganese-based positive electrode active material, there is an urgent need for lithium secondary batteries with improved high-temperature stability to improve high-temperature storage characteristics and high-temperature cycle characteristics.

DISCLOSURE

Technical Problem

The present disclosure is designed to solve the above problem, and therefore, the present disclosure is directed to providing, in the lithium secondary batteries using a manganese-based positive electrode active material, a positive electrode for a lithium secondary battery for improving high-temperature storage characteristics and high-temperature cycle characteristics.

Technical Solution

To achieve the above object, according to an aspect of the present disclosure, the present disclosure provides a positive electrode for a lithium secondary battery including an electrode current collector, and a positive electrode active material layer coated on at least a part of the electrode current collector, wherein the positive electrode active material layer includes a manganese-based positive electrode active material, and the porosity is from 30% to 35%.

According to an exemplary embodiment of the present disclosure, the manganese-based positive electrode active material may have the manganese content higher than or equal to 40%, and the manganese-based positive electrode active material may be represented by the following chemical formula 1:

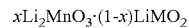 [Chemical formula 1]

where 0<x<1, and M is any one element selected from the group consisting of Al, Mg, Mn, Ni, Co, Cr, V, and Fe, or mixtures thereof.

According to another exemplary embodiment of the present disclosure, an average diameter of the manganese-based positive electrode active material may be from 5 μm to about 20 μm.

According to another exemplary embodiment of the present disclosure, the positive electrode active material layer may further include a binder and a conductive material.

According to another exemplary embodiment of the present disclosure, a content of the binder may be from 1 part by weight to 30 parts by weight per 100 parts by weight of the positive electrode active material.

According to another exemplary embodiment of the present disclosure, a thickness of the positive electrode active material layer may be from 45 μm to 60 μm.

According to another aspect of the present disclosure, the present disclosure provides a lithium secondary battery including a positive electrode, a negative electrode, and an electrolyte, wherein the positive electrode is a positive electrode according to the present disclosure.

Advantageous Effects

A positive electrode for a lithium secondary battery according to the present disclosure includes a manganese-based active material as a positive electrode active material, and may improve high-temperature storage characteristics and high-temperature cycle characteristics. Also, an amount of gas generating from the positive electrode active material may reduce, and the release of transition metal may be minimized, so precipitation of transition metal on the surface of a negative electrode active material may be minimized, and thus, safety and resistance characteristics may be improved.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

MODE FOR CARRYING OUT THE INVENTION

Figure 1:
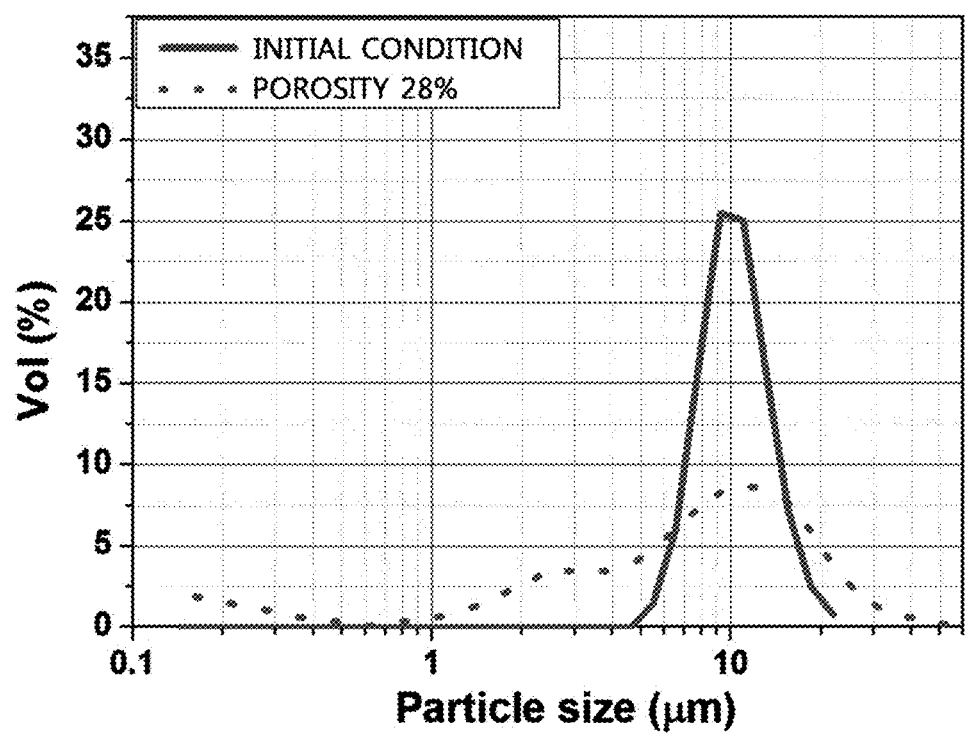
FIG. 1 is a distribution graph of a particle size of a positive electrode active material according to comparative example (porosity 28%).

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The present disclosure provides a positive electrode for a lithium secondary battery including an electrode current collector, and a positive electrode active material layer coated on at least a part of the electrode current collector, wherein the positive electrode active material layer includes a manganese-based positive electrode active material and the porosity is from 30% to 35%.

A lithium secondary battery always has a risk of ignition and/or explosion when stored at high temperature, and accordingly, there is a need for a safety means of a lithium secondary battery. Meanwhile, a manganese-based positive electrode active material is richer in manganese than other transition metal(s) and has a layered structure, but gas is often produced by a side reaction, and when manganese and other metals coming out of a positive electrode are dissolved in an electrolyte solution and form bonds with other organic matters on a negative electrode, causing precipitation, the resistance increases, which is problematic in terms of cycles and storage life span, and durability cannot be guaranteed. Particularly, as the release of manganese substance becomes more serious when stored at high temperature, a lithium secondary battery increases in resistance and reduces in output, which is an obstruction to development of a high-performance (high-output) manganese-based lithium secondary battery. The inventors attempted to prevent the ignition and/or explosion of a lithium secondary battery using a manganese-based positive electrode active material while not deteriorating the battery performance when stored at high temperature. According to their study, the inventors devised the present invention from a surprising experimental result that the above problems can be solved when the porosity of a positive electrode active material layer using a manganese-based positive electrode active material is higher than that of a related art, for example, from 30% to 35%.

In the case of a traditional positive electrode active material layer, the porosity was on the order of 20%, but in the manganese-based positive electrode active material layer, if the pressure is applied to reduce the porosity down to the 20% range, pulverization of the positive electrode active material occurs to a positive electrode active material, and when stored at high temperature, performance deterioration of a secondary battery becomes more serious due to the release of manganese. That is, when a manganese-based positive electrode active material is used, the present disclosure sets the porosity different from that of a general positive electrode active material layer, to solve the conventional problems.

The porosity of the positive electrode active material according to the present disclosure is from 30% to 35%, more preferably from 30.5% to 35%. When the porosity of the positive electrode active material is less than 30%, pulverization of the positive electrode active material and the Mn release occurs, and when the porosity is more than 35%, an output deterioration of a lithium secondary battery occurs.

The porosity is evaluated using a thickness measuring instrument under the pressure applied to the positive electrode after deducing a thickness of the positive electrode having the corresponding porosity from an equation into which consideration of the density and volume of each ingredient of the electrode is taken.

The manganese-based positive electrode active material represents that the manganese content is higher than or equal to 40% (a ratio of Mn to metals except Li).

According to one embodiment of the present disclosure, the manganese-based positive electrode active material may be a compound represented by the following chemical formula 1, but is not limited thereto.

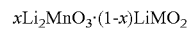    [Chemical formula 1]

In the above formula, 0<x<1, and M is any one element selected from the group consisting of Al, Mg, Mn, Ni, Co, Cr, V, and Fe, or mixtures thereof.

The material $xLi_2MnO_3 \cdot (1-x)LiMO_2$ is a complex material of $Li_2MnO_3$ and $LiMO_2$ with a capacity higher than or equal to 240 mAh/g-250 mAh/g, and to achieve this capacity, an activation step through charge with high voltage higher than or equal to 4.5 is needed. With the use of the manganese-based positive electrode active material as represented by the above chemical formula 1, the present disclosure may minimize a side reaction even if charge is performed with high voltage.

Preferably, the positive electrode active material for a lithium secondary battery may have an average diameter between about 5 μm and about 20 μm, and particularly, the positive electrode active material for a lithium secondary battery may have an average diameter between about 7 μm and about 13 μm, more particularly between about 9 μm and about 11 μm. Also, it is preferred that to the maximum extent possible, the positive electrode active material excludes positive electrode active material particles with a small average diameter, for example, less than 5 μm, subjected to grinding. More particularly, when the positive electrode active material layer with porosity less than 30% is formed, due to pulverization of the active material, a particle size distribution is greater than a distribution of the positive electrode active material particles according to the present disclosure and there is a high probability that particles with an average diameter less than 5 µm will be included.

The positive electrode active material of the present disclosure may constitute the positive electrode for a lithium secondary battery together with a binder and a conductive material being commonly used in the art.

The binder is a substance that aids the binding of the positive electrode active material and the conductive material, etc. and the binding of the positive electrode active material to the current collector, and may be added in an amount of, for example, 1 part by weight to 30 parts by weight per 100 parts by weight of the positive electrode active material, but its content is not particularly limited in the present disclosure. The binder may include, but is not limited to, for example, polyvinylidene fluoride (PVdF), polytetrafluoroethylene (PTFE), fluororubber, styrene-butadiene rubber (SBR), and cellulose-based resin.

The conductive material may be added in an amount of, for example, 1 part by weight to 50 parts by weight per 100 parts by weight of the positive electrode active material, but its content is not particularly limited in the present disclosure. The conductive material is not limited to a particular type if it is conductive while not causing a chemical change in the battery in question, and may include, for example, a carbon black-based conductive material such as graphite or acetylene black The dispersant may be selected from the group consisting of N-methyl-2-pyrrolidone, diacetone alcohol, dimethylformaldehyde, propyleneglycol monomethylether, methyl cellosolve, ethyl cellosolve, butyl cellosolve, isopropyl cellosolve, acetylacetone, methyl isobutyl ketone, n-butyl acetate, cellosolve acetate, toluene, xylene, and mixtures thereof, but is not limited thereto.

The positive electrode active material, the binder, and the conductive material are dispersed in the dispersant to prepare a positive electrode slurry that may be coated on a positive electrode current collector and dried to form a positive electrode for a lithium secondary battery.

The positive electrode current collector generally has a thickness of 10 µm to 500 µm. The positive electrode current collector is not limited to a particular type if it has high conductivity while not causing a chemical change in the corresponding battery, and may be made from, for example, stainless steel, aluminum, nickel, titanium, baked carbon, or aluminum or stainless steel treated with carbon, nickel, titanium, or silver on the surface.

A thickness of the positive electrode active material layer slurry on the positive electrode current collector is not particularly limited, and may be, for example, from 10 µm to 300 µm, and a loading amount of active materials may be 5 mg/cm$^2$ to 50 mg/cm$^2$.

The thickness of the positive electrode active material layer produced as above may be from 45 µm to 60 µm.

In a lithium secondary battery including a positive electrode, a negative electrode, a separator interposed between the positive electrode and the negative electrode, and an electrolyte solution, the present disclosure provides a lithium secondary battery using a non-aqueous electrolyte solution according to the present disclosure.

In another embodiment of the present disclosure, there is provided a lithium secondary battery including a positive electrode, a negative electrode, a separator interposed between the positive electrode and the negative electrode, and an electrolyte solution, wherein the above positive electrode is used as the positive electrode.

Also, the lithium secondary battery may be fabricated by producing the negative electrode, the separator, and the electrolyte solution in accordance with a general method known in the art and assembling them with the positive electrode.

A non-limiting example of a negative electrode active material may include a general negative electrode active material used in a negative electrode of a traditional lithium secondary battery, and in particular, a lithium adsorption material such as a lithium metal or a lithium alloy, carbon, petroleum coke, activated carbon, graphite, or other carbons is preferred. A negative electrode current collector may be, as a non-limiting example, a foil made from copper, gold, nickel or copper alloy, or combinations thereof.

For the separator, a polyolefin-based film such as porous polyethylene and porous polypropylene, an organic/inorganic composite separator having a porous coating layer formed on a porous substrate, a non-woven film, and engineering plastic may be used, but the separator is not limited thereto. As a process of applying the separator to a battery, a lamination/stacking process and a folding process of the separator and the electrode as well as a winding process being generally used are available.

The electrolyte solution that may be used in one embodiment of the present disclosure may be a solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

Also, with an aim to improve the charging/discharging characteristics and retardancy, for example, pyridine, triethylphosphite, triethanol amine, cyclic ether, ethylene diamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and trichloro aluminum may be added to the electrolyte solution. According to circumstances, to impart non-flammable properties, a halogen containing solvent such as carbon tetrachloride and trifluoroethylene may be further included, and to improve the preserving characteristics at high temperature, carbon dioxide gas may be further included, and fluoro-ethylene carbonate (FEC), propene sultone (PRS), and fluoro-propylene carbonate (FPC) may be further included.

The pouring of the electrolyte solution may be performed in any suitable step of a battery manufacturing process based on a manufacturing process and required properties of a final product. That is, the pouring of the electrolyte solution may be applied before a battery assembling operation or in the last step of the battery assembling operation.

The secondary battery according to the present disclosure may be not only used in a battery cell for use as a power source of a small device, but also as a unit battery in a medium-large sized battery module including a plurality of battery cells.

Also, the present disclosure provides a battery pack including the battery module as a power source of a medium and large-sized device, and the medium and large-sized device may include, but is not limited to, an electric car including an electric vehicle (EV), a hybrid electric vehicle (HEV) and a plug-in hybrid electric vehicle (PHEV), and an energy storage system.

Hereinafter, the present disclosure will be particularly described through examples to provide a detailed description. The embodiments of the present disclosure, however, may take several other forms, and the scope of the present disclosure should not be construed as being limited to the examples described below. The embodiments of the present disclosure are provided to more fully explain the present disclosure to those having ordinary knowledge in the art to which the present disclosure pertains.

Production of a Positive Electrode Active Material

An active material with the Mn content of 45% as a positive electrode active material, polyvinylidene fluoride (PVdF) as a binder, and carbon as a conductive material were mixed at a weight ratio of 92:4:4 and dispersed in N-methyl-2-pyrrolidone to prepare a positive electrode slurry, and the slurry was coated on an aluminum current collector, followed by drying and rolling, to manufacture a positive electrode having a positive electrode active material layer formed on the aluminum current collector.

In this instance, the positive electrode active material with the porosity as shown in the following Table 1 was produced by adjusting the porosity of the positive electrode active material under the same pressure over the entire positive electrode.

TABLE 1

|  | Porosity |
| --- | --- |
| Comparative example 1 | 28% |
| Comparative example 2 | 29% |
| Example 1 | 31% |
| Example 2 | 33% |
| Example 3 | 35% |
| Comparative example 3 | 36% |

Fabrication of a Lithium Secondary Battery

Acetylene black as a negative electrode active material, styrene butadiene rubber (SBR), and carboxy methyl cellulose (CMC) were mixed at a weight ratio of 97:2:1 and dispersed in water to prepare a negative electrode slurry, and the slurry was coated on a copper current collector, followed by drying and rolling, to manufacture a negative electrode. Subsequently, a coin cell was fabricated by a common method using the manufactured positive and negative electrodes together with a PE separator, and after pouring the electrolyte solution, fabrication of a battery was completed.

Experimental Example

Particle Size Measurement of Positive Electrode Active Material

The particle size measurement of the positive electrode active materials of examples and comparative examples was carried out using a PSD instrument after dispersing the active materials in water, and their results are shown in FIG. 1. As shown in FIG. 1 below, it can be seen that D50 is 10 um. Also, when the pressure is applied to the active material to reach the porosity of 28%, it can be seen that a particle size distribution increases due to pulverization of the active material.

Measurement of an Amount by which Resistance Increases

Figure 2:
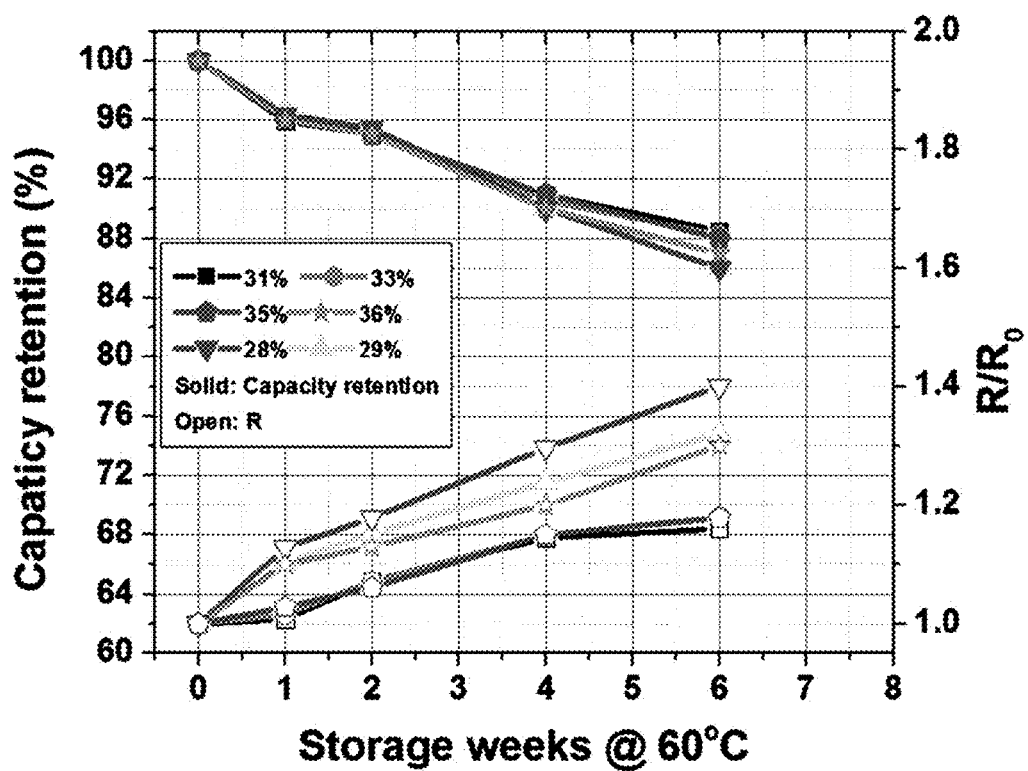
FIG. 2 is a graph illustrating a capacity decrease rate and a resistance increase rate of lithium secondary batteries manufactured according to example and comparative example.

The lithium secondary batteries obtained in examples and comparative examples were charged to SOC80, and after stored at 60° C. for 1, 2, 4, and 6 weeks, were discharged to SOC50 with 5 C current for 17 seconds, and measurement results of a capacity decrease rate and a resistance increase rate are shown in FIG. 2. As shown in FIG. 2, it is found that the lithium secondary batteries according to examples have a lower resistance increase rate and a lower capacity decrease rate than the lithium secondary batteries according to comparative examples.

Figure 3:
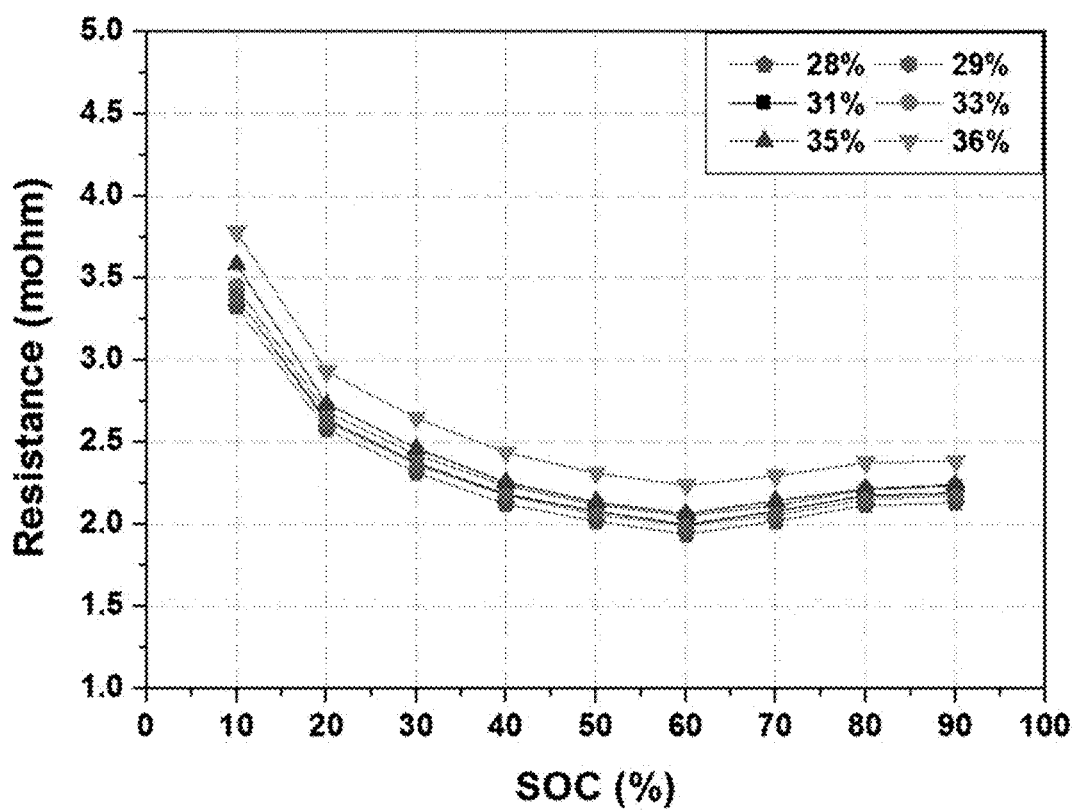
FIG. 3 is a graph showing a measure of resistance of lithium secondary batteries manufactured according to example and comparative example.

Also, a magnitude of resistance was measured based on the porosity, and its result is shown in FIG. 3. Through FIG. 3, it can be seen that as the porosity reduces, the resistance tends to reduce. Also, particularly when the porosity is higher than or equal to 36%, a rate of increase in resistance is found to become noticeably larger.

Measurement of Precipitated Metal Amount

After the lithium secondary batteries obtained in examples and comparative examples were stored at SOC80 for 6 weeks, an amount of precipitated metals was measured and their results are shown in Table 2. As shown in the following Table 2, when the porosity according to the present disclosure is maintained, it is found that an amount of precipitated manganese noticeably reduces.

TABLE 2

| Porosity | Amount of metals precipitated on a negative electrode (unit: ppm) | | |
| --- | --- | --- | --- |
|  | Ni | Mn | Co |
| Comparative example 1 - 28% | 8.5 | 85 | 11 |
| Comparative example 2 - 29% | 8 | 80 | 10 |
| Example 1 - 31% | 8 | 50 | 10 |
| Example 2 - 33% | 7 | 45 | 8 |
| Example 3 - 35% | 7 | 43 | 8 |
| Comparative example 3 - 36% | 7 | 41 | 7 |

What is claimed is:

1. A positive electrode for a lithium secondary battery, comprising:
    an electrode current collector; and
    a positive electrode active material layer coated on at least a part of the electrode current collector,
    wherein the positive electrode active material layer comprises a manganese-based positive electrode active material, and a porosity is from 30% to 35%,
    wherein an average diameter of the manganese-based positive electrode active material is from 5 μm to about 20 μm,
    wherein a manganese content of the manganese-based positive electrode active material is at least 40 weight % in a ratio of Mn to all metals except lithium,
    wherein the manganese-based positive electrode active material is represented by the following chemical formula 1:

$xLi_2MnO_3 \cdot (1-x)LiMO_2$   [Chemical formula 1]

where 0<x<1, and M is any one element selected from the group consisting of Mn, Ni, Co and mixtures thereof.

2. The positive electrode for a lithium secondary battery according to claim 1, wherein the positive electrode active material layer further comprises a binder and a conductive material.

3. The positive electrode for a lithium secondary battery according to claim 2, wherein a content of the binder is from 1 part by weight to 30 parts by weight per 100 parts by weight of the positive electrode active material.

4. The positive electrode for a lithium secondary battery according to claim 1, wherein a thickness of the positive electrode active material layer is from 45 μm to 60 μm.

5. A lithium secondary battery comprising a positive electrode, a negative electrode, and an electrolyte, wherein the positive electrode is a positive electrode according to claim 1.

* * * * *